United States Patent Office 3,135,213
Patented June 2, 1964

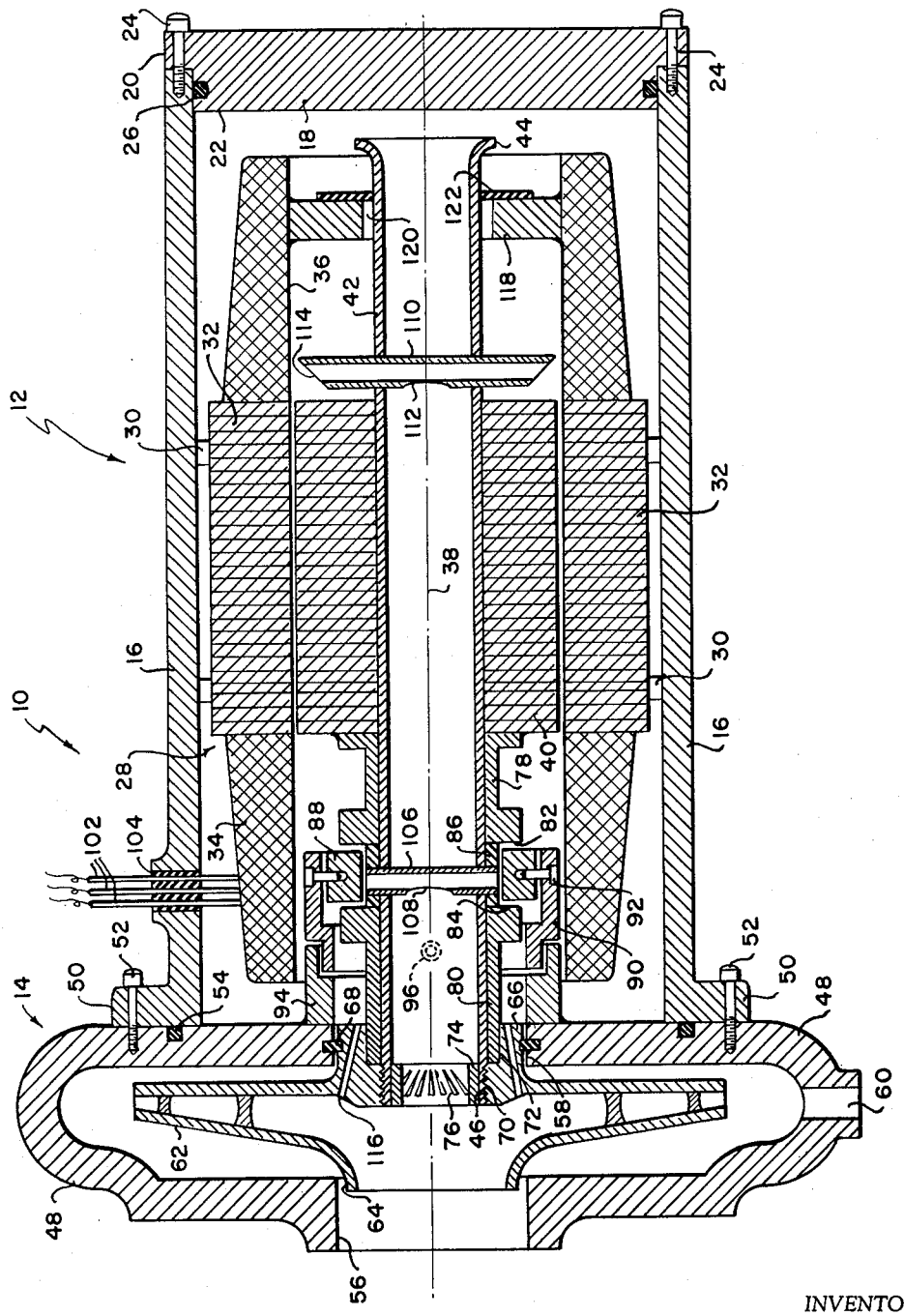

3,135,213
IMMERSIBLE MOTOR-PUMP UNIT
Watt V. Smith, 315 Old Country Road, Severna Park, Md., and Robert J. Flaherty, Jr., 632 Binsted Road, Glen Burnie, Md.
Filed Oct. 30, 1962, Ser. No. 234,262
19 Claims. (Cl. 103—87)
(Granted under Title 35, U.S. Code (1952), sec. 266)

The invention described herein may be manufactured and used by or for the Government of the United States of America for governmental purposes without the payment of any royalties thereon or therefor.

This invention relates to a combined motor-pump unit and more particularly it relates to a motor-pump unit which is capable of operation while immersed in an ambient fluid, such fluid being utilized to cool and lubricate the motor and thrust bearing of the unit and also to hydrodynamically position the motor rotor and stator elements.

In the past, electric motors required shafts to radially position the rotor elements relative to the stator elements. Such radial positioning was accomplished by individual spaced shaft supporting bearings, but these bearings created numerous problems such as cleaning, lubricating, replacement and the like. Recently, the present inventors solved these problems by inventing an electric motor which dispensed with the conventional shaft and shaft bearings, but retained their function. This was accomplished by developing a hydrodynamic film of ambient fluid between the rotor and stator elements during operation of the motor. This particular electric motor is the subject matter of patent application Serial No. 225,943, (Navy Case No. 34,086) filed September 24, 1962, in the name of the present inventors.

The present invention contemplates the use of an electric motor embodying the principles of the above-mentioned application in combination with a pump, thereby providing a unitary motor-pump which has as one of its objects, the provision of a device which is capable of operating immersed in a gaseous or liquid medium, including an active and corrosive medium such as sea water.

Another object of this invention is to provide a motor-pump unit in which the flow of ambient fluid passes through the motor, thus contacting the electrical parts thereof for the purpose of cooling them and also for positioning the relatively rotational parts of the motor.

A further object of this invention is to provide a motor pump combination in which the motor has a rotor and stator with coacting surfaces and in which the rotary pump parts are operated by the motor rotor, said rotor and stator coacting surfaces acting as positioning and supporting elements for each other and for said pump rotary parts, thus eliminating the need for separate positioning and supporting bearings and thereby reducing the weight and volume of the combination, and thus also eliminating the need for a shaft which previously was needed to transmit positioning forces between separate bearing elements and the rotor.

Yet a further object of this invention is to provide a motor driven pump which is constructed in such a manner that the motor and pump are connected to form a single unit in which the critical interior working parts are suitably embedded in a liquid-impervious material so that the entire unit is capable of being submerged in a liquid to be pumped, and in which the liquid is permitted to circulate through the interior of the unit thus lubricating and cooling the same, permitting it to operate with higher electrical currents, reducing the noise generated by its operation, and eliminating the need for sealing elements, liners, and the like which previously were needed to protect the interior of such a unit from deleterious effects of the liquid to be pumped.

Still another object of this invention is to provide a motor-pump unit which has means for distributing a part of the fluid to be pumped through the interior of the unit to cool and lubricate the same, and which also has means for separating such fluid so only clean, dirt-free fluid is used in lubricating the unit.

Other objects, advantages and salient features of the present invention will be apparent from the following description taken in connection with the annexed drawing, the sole figure of which illustrates a longitudinal sectional view of a preferred embodiment of a motor-pump unit in accordance with the present invention.

Referring to the drawing, the unit, which is designated as 10, is composed of a motor section generally indicated as 12 and a pump section generally indicated as 14. The motor section 12 houses an electric motor, preferably the induction type, within a hollow, open ended casing 16. One end of the casing 16 is provided with an end plate 18 having an outer portion 20 conforming in size and shape to the outside of the casing 16, and an inner portion 22 extending into, and conforming in size and shape to, the inside of the casing 16. The end plate 18 is attached to the casing 16 by a plurality of bolts 24 which pass through the end plate outer portion 20, or by any other suitable fastening means. The end plate inner portion 22 is provided with an annular groove in which an O-ring 26 is mounted, the O-ring and groove cooperating in a well known manner to prevent leakage through the end of the casing.

A stator generally indicated as 28, and preferably conforming in shape to the inside of the motor casing 16, is mounted within said casing and is fixedly attached thereto by means of segmental spacers 30 which space the stator slightly away from the interior casing walls to provide cooling passages or spaces. The stator 28 is comprised of a laminated core structure 32 and field windings 34, both of conventional electric motor type construction, preferably three phase. The stator is provided with a central internal cylindrical bore 36 having as its axis, the axis of rotation of the device, this axis being identified by the reference numeral 38.

A cylindrical rotor 40 of the conventional laminated induction type, is freely mounted within the stator bore 36. The rotor 40 is provided with a central internal cylindrical bore, both the rotor and its bore having as their central axis, the axis of rotation 38, and thus being coaxial with the stator bore 36. The outer surface of the rotor 40 and the inner surface of the stator 28, as defined by the walls of the bore 36, define the complemental working surfaces of the motor and, as such, are mating and coacting substantially smooth continuous surfaces, with the outer diameter of the rotor 40 being very slightly smaller than the diameter of the stator bore 36, to thereby provide an annular clearance region between the stator and the rotor.

For operation while immersed in liquids as well as in gases, the stator and rotor elements are coated or encapsulated in epoxy resin or other similar material to render them impervious and inert to the deleterious effects of the surrounding liquid. The stator element and the rotor element are embedded separately and are completely surrounded and encased by the material, after which the stator bore surface and the rotor outer surface are properly machined and polished to provide a clearance therebetween equivalent to that normally utilized in a normal journal bearing, which is 0.001 to 0.003 inch of clearance per inch of rotor diameter. A specific coating and an encapsulation process have been disclosed in applicants' co-pending application, mentioned above, and a model of a motor treated in such a manner has been operated in sea water for long periods of time without suffering any adverse effects.

A hollow tube 42 is mounted within the rotor bore and is fixedly secured to the rotor itself, whereby rotation of the rotor causes a corresponding rotation of the tube 42. The tube itself extends substantially the length of the motor casing 16 and is provided with a cylindrical or flared portion 44 at the end adjacent the end plate 18, and with a threaded portion 46 at the other end.

The pump section 14 of the unit 10 is housed within a hollow impeller housing 48 which is attached to a flanged portion 50 of the motor casing 16 by means of a plurality of bolts 52, or other suitable fastening means. Obviously the housing 48 and the casing 16 together may be considered as a single casing means for the entire motor-pump unit 10. An annular groove with an O-ring 54 is provided at the interface between the impeller housing 48 and the flange 50 to prevent fluid leakage therebetween, but other suitable sealing means can be employed if desired. The impeller housing is provided with a pair of apertures, 56 and 58, coaxial with the axis of rotation 38, and another aperture 60 substantially axially perpendicular to that axis. The aperture 56 serves as the inlet for the unit and the aperture 60 serves as the outlet. The aperture 58 provides a passage between the pump section 14 and the motor section 12. The threaded portion 46 of the hollow tube 42 extends through the aperture 58 and into the interior of the impeller housing 48.

An impeller 62, of a conventional construction, is mounted within the interior of the impeller housing 48. The forward portion 64 of the impeller lies partially within the inlet aperture 56 for the purpose of directing the incoming fluid into the impeller 62, wherein upon rotation of the impeller, the fluid is expelled outward toward the periphery of the impeller and is discharged through the outlet aperture 60, such operation being well known and understood by those skilled in the art. The rear portion 66 of the impeller extends within the aperture 58 and is provided with means for mounting a ring 68 which connects between the outer surface of the rear portion 66 and the walls of the aperture 58. The ring 68 should be fabricated of self-lubricating material such as carbon graphite, a material sold under the trademark Teflon (tetrafluoroethylene resin), or some other similar suitable material, and serves both as a sealing ring and a bearing ring. The rear portion 66 of the impeller is provided with a threaded bore 70 and an unthreaded counterbore 72, both axial along the axis of rotation 38. The threaded bore 70 mates with the external threads 46 on the hollow tube 42 to thereby attach the impeller 62 to the tube 42 which in turn, as aforementioned, is attached to the rotor 40. Other suitable attachment means may be employed for joining the rotor and the impeller.

A secondary impeller is mounted within the impeller end of the hollow tube 42 to serve a means for drawing part of the incoming fluid through the tube 42, while the remainder of the incoming fluid is expelled outward through the impeller 62. The secondary impeller is shown as a ring 74 with blades 76 mounted on the interior surface thereof, the whole structure being shrink fitted into the tube 42; however, it should be understood that any other suitable conventional impeller may be used as the secondary impeller.

The unit is provided with a thrust bearing assembly to limit axial thrust which may occur during operation. A pair of thrust cylindrical thrust runners 78 and 80 are suitably attached to the exterior of the hollow tube 42. The thrust runner 78 can also be attached at one end to the rotor 40, and is provided at its other end with an expanded portion having a flat face 82 which acts as a thrust bearing surface. The thrust runner 80 has one end which fits into the counterbore 72 in the impeller rear portion 66, and the other end of the thrust runner 80 is provided with an expanded portion having a flat face 84 which acts as a thrust bearing surface. A spacer ring 86 is also mounted on the exterior of the tube 42, extending between the thrust faces 82 and 84.

The thrust shoe is formed as a cylindrical disc 88 having a pair of substantially parallel planar surfaces which mate in spaced relation with the bearing surfaces 82 and 84, and having a central aperture slightly larger diametrically than the spacer ring 86. Since the thrust shoe 88 is of the double acting type in that it can absorb thrust in either axial direction, it is necessary that means be provided to allow proper orientation of the shoe at all times. To this end, a gimbal mounting means is provided. The mounting means includes a first ring 90 having a pair of pins 92 defining an axis extending perpendicularly to the axis of rotation 38 and pivotally mounting the thrust shoe 88, and a second ring 94 having a pair of pins 96 defining an axis displaced 90 degrees from the axis defined by the pins 92 and also extending perpendicularly to the axis of rotation 38, and pivotally mounting the first ring 90. The entire gimbal mounting means is supported by affixing the second ring 94 to the outer wall of the impeller housing 48 by some suitable means, such as welding.

Conductors 102 extending through a substantially fluid-tight stopper 104 are provided for connecting an alternating current source, preferably three phase, to the stator field windings 34 for the purpose of energizing them. When these windings 34 are energized, they create a rotating magnetic field in the stator laminations 32 which in turn causes rotation of the rotor 40 by means of induced current, in a manner well-known in conventional induction motors. Since the hollow tube 42 is affixed to the rotor 40, the tube also rotates when the motor is energized, and since the tube rotates, the associated parts which are affixed to it also rotate. These associated parts include the impeller 62, the secondary impeller 74, 76, the thrust runners 78 and 80, and the spacer ring 86. Thus, when the device is put into operation, the incoming fluid entering through the inlet 56 flows through the impeller forward portion 64 and from there is either expelled outward through the impeller 62, or is drawn through the hollow tube 42 by action of the secondary impeller.

The fluid which flows through the hollow tube 42 provides the hydrodynamic film for the thrust bearing and the hydrodynamic film for supporting and positioning the rotor, and also serves as a coolant material for both the electric motor and the thrust bearing. It is desirable to have the fluid which forms the hydrodynamic films be as pure and free from particulate matter as possible, and the centrifugal force created by operation of the motor is used to achieve this purity. As incoming fluid is drawn into the hollow tube 42 by the secondary impeller 74, 76, it rotates at the same speed as the speed of rotation of the tube itself, which also is the speed of rotation of the rotor 40. Since the fluid within the tube is rotating about the axis of rotation 38, the centrifugal forces created by such rotation force the heavier portion of the fluid outward from the axis 38 toward the walls of the tube 42. The heavier portion of the fluid is that portion which contains dirt or particulate matter; thus as the fluid flows through the tube 42, the purest fluid is that at the center or axial portion of the tube and the dirty portion of the fluid is that at or near the walls of the tube 42. The centrifugal separation effect is described in greater detail in patent application Serial No. 253,233 filed January 22, 1963 (Navy Case No. 34,502) in the name of one of the present inventors, Watt V. Smith, wherein a centrifugal separator utilizing this effect is described.

A pair of centrifugal separating pumps are provided to take advantage of this centrifugal separation effect which occurs in fluid flowing through the tube 42. These pumps receive clean fluid from the axial portion of the tube 42 and direct such fluid, under pressure, to the thrust bearing and to the clearance region between the stator and the rotor. The pumps themselves are fabricated in the form of hollow cross-flow tubes having central slot portions of suitable design which act as fluid inlets.

More specifically, one of the centrifugal separating pumps or cross-flow tubes includes a pump tube 106 which extends transversely across the hollow tube 42 and is mounted within the spacer ring 86. The tube 106 is provided with a cut-out or slot portion 108 in the region adjacent the axis 38. This slot portion 108 is formed in the tube wall which faces toward the secondary impeller so that as the fluid flows through the tube 42, part of the clean fluid at the center or axial portion of the tube 42 will enter into the slot portion 108. Since the pump tube 106 is attached to the tube 42, it rotates along therewith it, and such rotation causes the fluid in the pump tube 106 to flow outward and exit from the pump tube and surround the thrust shoe 88. Since the thrust bearing surfaces 82 and 84 are rotating while the thrust shoe 88 surfaces are stationary, this relative rotation causes the fluid which exits from the pump tube 106 to create a hydrodynamic thrust-bearing film between the bearing surfaces of the thrust shoe 88 and the bearing surfaces 82 and 84 of the thrust runners 78 and 80.

The other centrifugal separating pump or cross-flow tube includes a pump tube 110 which is mounted beyond the rotor 40 and extends transversely across the hollow tube 42. The pump tube 110 is provided with a cut-out or slot portion similar in shape and orientation to the slot portion 108. The ends of the tube 110 extend almost to the wall surface of the stator bore 36, and these ends may be sloped or cut-back as illustrated at 114 by cutting them off in a plane which forms an angle of about 45 degrees with the longitudinal axis of the pump tube 110. Clean fluid enters the pump tube 110 through its slot portion 112, flows outward in the manner previously described for the cross-flow tube 106, and exits from the sloped ends 114. The exiting fluid is directed into the space between the outside of the rotor 40 and the walls of the stator bore 36 by means of the pressure generated by the pump tube 110, where due to the relative rotation between the rotor and the stator, a hydrodynamic film is created. This film radially supports and positions the rotor 40 and renders it completely out of contact with the stator as the rotor and stator rotate relative to one another.

The dirty fluid which was adjacent the walls of the tube 42 and was thus unable to enter the cross-flow tubes, and any clean fluid which did not enter the crossflow tubes, flows to the far end of the tube 42 where it exits from the flared end portion 44. To prevent this dirty fluid from flowing backward and intermixing with the rotor supporting hydrodynamic film, a seal means can be provided. Such a seal means can be formed by affixing an annular ring 118 to the walls of the stator bore 36, said ring having a central aperture 120 through which the tube 42 extends. A sealing ring 122, fabricated of a material similar to the ring 68, is mounted on the tube 42 and is adapted to abut against the face of the annular ring 118, thus preventing back-flow through the aperture 120.

The fluid which exits from the flared end 44 of the tube 42 passes around the outside of the stator, thus cooling it. This fluid flows through the passages between the stator and the casing which are formed by the spaces 30 and returns to the inlet or suction end of the unit. The fluid from the hydrodynamic film between the rotor and stator and the fluid from the thrust bearing hydrodynamic film both flow to the inlet or suction end of the unit wherein they mix and join with the cooling fluid. The pressure of the fluid being pumped through the tubes 106 and 110 is higher than the pressure of the cooling fluid within the casing 16, and this pressure differential prevents the dirty cooling fluid from returning to the regions where the hydrodynamic films exist. To remove the intermixed cooling fluid and film fluid from the inlet end of the casing 16, a series of small flow passages 116 are provided in the rear portion 66 of the impeller 62, said passages extending angularly outward from the axis of rotation 38 and thereby providing the pumping capability required to pump the intermixed fluid out through the passages 116 and into the impeller 62, wherein such fluid is impelled outward through the impeller toward the outlet 60.

The present device thus provides a unit which is especially adapted for operation in a liquid medium, such as sea water. The unit can operate with its exterior in air and its interior filled with sea water or the like, such operation being known as "filled" operation. It can also operate totally submerged in a body of sea water or the like, such operation being known as "submerged" operation. In either "filled" or "submerged" operation, the sea water will flow through the device to cool it, to provide the hydrodynamic rotor supporting film, and to provide the hydrodynamic thrust bearing film. Since the electrical parts of the unit are suitably embedded and encapsulated in a material which renders them impervious and inert to liquids, the usual problems of corrosion, short circuiting, and the like, are eliminated. If it is desired to pump highly reactive fluids, such as acids, the exposed metal parts of the unit should be made of a suitable compatible material, such as stainless steel.

It can thus be seen that the present invention provides a device which, in operation creates clean hydrodynamic films of the fluid which is being pumped, which films eliminate frictional contact between the rotating parts, and thus increase the efficiency of the device. Also, this lack of frictional contact, coupled with the coating and encapsulation of the motor laminations which reduces vibrations, tends to provide a device which operates with relative silence.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A motor-pump unit capable of operating immersed in or filled with fluid, said device comprising:

casing means having at least two apertures therein which define an inlet and an outlet;

a stator member affixed to the interior of said casing means and having a central cylindrical bore therein which is generated about an axis which defines an axis of rotation;

a rotor member having a cylindrical outer surface and a cylindrical central bore, both coaxial with the axis of rotation, said rotor outer surface being diametrically slightly smaller than said stator bore to thereby permit said rotor member to be freely mounted within said stator bore with a small annular space between said rotor and stator members;

a hollow elongated cylindrical tube open at both ends mounted within said rotor bore and affixed to the walls thereof whereby rotor rotation also causes rotation of said tube;

an impeller affixed to one end of the hollow tube and adapted to draw fluid in through the inlet and expel it at higher pressure through the outlet;

a power supply means for electrically energizing said stator member which in turn induces a current in said rotor member which causes said rotor member to rotate relative to said stator member; and means for distributing and directing a portion of the ambient fluid which enters the inlet, to the annular space between said rotor and stator members;

means fluidly communicating with and responsive to said distribution and direction means for providing a fluid bearing, wherein relative rotation between said members causes said fluid to create a hydrodynamic film which provides total radial supporting and positioning forces for said rotor member.

2. A motor-pump unit as defined in claim 1 but further characterized by a secondary impeller affixed within the hollow tube at the same end as said impeller, said secondary impeller being rotatable along with said hollow tube to draw incoming ambient fluid into said tube.

3. A motor-pump unit as defined in claim 2 wherein the means for distributing and directing fluid to the annular space between the stator and rotor comprises a centrifugal separating pump in the form of a cross-flow tube having its inlet at the center, axial portion of said hollow tube, and having its outlet adjacent the annular space, whereby rotation of said hollow tube and said associated cross-flow tube causes dirt in the incoming fluid to be centrifugally displaced outward toward the walls of said hollow tube, and thus causes clean, dirt-free fluid to enter the cross-flow tube inlet and flow to said annular space.

4. A motor-pump unit comprising:
   a casing means having at least one aperture therein to permit fluid entry and egress;
   an electric motor means adapted to provide motive force for pumping fluid;
   said electric motor means including three generally cylindrical hollow elements concentrically arranged about an axis of rotation and defining an outer element, and intermediate element and an inner element;
   said outer element defining a stator means affixed to said casing means;
   said intermediate element defining a rotor means having an outside diameter slightly less than the inside diameter of said stator means and thus forming an annular space between said rotor and stator means;
   said inner element defining a hollow axially elongated tube affixed to the inside of said rotor means;
   a pump means affixed to one end of said hollow tube;
   said pump means including a first impeller adapted to draw in fluid at its center and expel said fluid at high velocity at its periphery, and a second impeller adapted to draw fluid axially along the interior of said hollow tube;
   electrical means for energizing said stator means to set up a rotating magnetic field therein which in turn causes said rotor means and the hollow tube affixed to said rotor means to rotate about the axis of rotation;
   said rotor rotation providing the motive force to operate said pump means, and also providing centrifugal force to separate dirt from the fluid inside said hollow tube by forcing the dirt outward toward the walls of said tube and thus providing dirt-free fluid at the axial portion of said tube;
   thrust bearing means for limiting axial thrust of said rotor means;
   means for directing and distributing dirt-free fluid from the axial portion of said hollow tube to said thrust bearing means wherein said fluid forms a hydrodynamic thrust bearing film;
   means for directing and distributing dirt-free fluid from the axial portion of said hollow tube to the annular space between said rotor means and said stator means wherein said fluid forms a hydrodynamic film which totally supports said rotor means and maintains it spaced completely out of contact with said stator means while said rotor means is rotating.

5. A motor-pump unit as defined in claim 4 wherein said rotor means and said stator means are encapsulated in a resinous material which renders them impervious and inert to the deleterious effects of the fluid when the fluid is a liquid.

6. A motor-pump unit as defined in claim 4 wherein said thrust bearing means is of the double-acting type and comprises a nonrotatable thrust shoe having a pair of opposed bearing surfaces, and a pair of thrust runners affixed to the outside of said hollow tube and adapted to rotate with it, each of said thrust runners providing a bearing surface in spaced juxtaposition to a thrust shoe bearing surface, whereby when relative rotation occurs between said juxtaposed bearing surfaces, a hydrodynamic film is developed.

7. A motor-pump unit as defined in claim 6 wherein the thrust shoe is mounted in a gimbal mounting means which permits angular movement of said thrust shoe about the axis of rotation.

8. A motor-pump unit as defined in claim 4 wherein the means for directing and distributing fluid to said thrust bearing and the means for directing and distributing fluid to said annular space each comprises a centrifugal separating pump in the form of a cross-flow tube having an inlet in the axial portion where the dirt-free fluid is located, and having an outlet adjacent the area where the hydrodynamic film is to be created.

9. A motor driven pump device capable of operating while filled with or totally submerged in a liquid which is to be pumped, said device comprising:
   a motor casing having a central axis which defines an axis of rotation, and also having an open end portion;
   a pump housing affixed to said motor casing open end portion and having three apertures therein which comprise a first aperture defining a liquid inlet opening, a second aperture defining an access opening between said pump housing and said motor casing, and a third aperture defining a liquid outlet opening;
   a stator element fixedly mounted within said motor casing and having a smooth internal cylindrical bore axial along said axis of rotation;
   a cylindrical rotor element concentrically mounted within said stator bore and having a smooth outer surface slightly smaller diametrically than said stator bore so that a small clearance region exists between the walls of the stator bore and the exterior surface of said rotor element;
   said rotor element also having a central cylindrical bore axial along said axis of rotation;
   a hollow tube axially elongated along the axis of rotation and fixedly mounted within said rotor bore whereby said tube rotates as said rotor element rotates;
   said hollow tube having one end defining a pump end which extends through said second pump housing aperture into said pump casing;
   a first impeller mounted on the outside of the pump end of said hollow tube and having an inlet portion adjacent the inlet opening so that incoming liquid can enter said impeller, and having a peripheral portion adjacent the outlet opening so that the incoming liquid which enters said impeller can be expelled peripherally outward toward said outlet as said impeller is rotated by rotation of said hollow tube;
   a second impeller mounted on the inside of the pump end of said hollow tube and adapted to draw some of said incoming liquid axially into the interior of said hollow tube as rotation of said tube occurs;
   thrust bearing means in spaced concentric relation about the outside of said hollow tube and adapted to prevent axial movement of said rotor element and its associated hollow tube along the axis of rotation;
   electrical means for energizing said stator element by setting up a rotating magnetic field therein which in turn causes the rotor element, and the hollow tube affixed to said rotor element, to rotate about said axis of rotation;
   said rotor rotation causing said first and second impellers to rotate to thereby distribute incoming liquid respectively to the outlet and through said hollow tube, and also causing any dirt in the liquid within said hollow tube to centrifugally move outward toward the walls of said tube thus leaving clean, dirt-free liquid at the axial portion of said tube;

means for diverting a portion of the clean liquid from the axial portion of said hollow tube to said thrust bearing means to provide a hydrodynamic thrust bearing film therein;

means for diverting another portion of the clean liquid from the axial portion of said hollow tube to the clearance region between the rotor and stator elements to provide a hydrodynamic film therein to support and position said rotor element; and means for permitting the unclean portion of said liquid to surround and cool said stator element while preventing said unclean liquid from mingling with the clean fluid in said clearance region.

10. A device as defined in claim 9 wherein said first and second pump housing apertures are aligned axially with said axis of rotation.

11. A device as defined in claim 9 wherein said rotor and stator elements are coated with a resinous material which renders them impervious and inert to the detrimental effects of the liquid as it passes through said device.

12. A device as defined in claim 9 wherein said clearance region has a radial dimension of between 0.001 and 0.003 inch per inch of rotor diameter.

13. A device as defined in claim 9 wherein said thrust bearing means includes a pair of spaced thrust runners affixed to the outside of said hollow tube and thus presenting opposed bearing surfaces, and a thrust shoe means nonrotatably mounted between said thrust runners and having planar surfaces which act as mating bearing surfaces with said thrust runner bearing surfaces, whereby when relative rotation occurs between each thrust runner bearing surface and its associated thrust shoe bearing surface, a hydrodynamic thrust bearing film is developed.

14. A device as defined in claim 13 wherein said thrust shoe means is pivotally mounted within a first mounting ring by means of a pair of opposed pins axially transverse to the axis of rotation, and said first mounting ring is pivotally mounted within a second mounting ring by means of a pair of opposed pins axially transverse to the axis of rotation and also axially displaced ninety degrees from the axis of the pins of said first mounting ring.

15. A device as defined in claim 13 wherein the means for diverting clean liquid to the thrust bearing means is a centrifugal separating pump in the form of a cross-flow tube having its inlet at the axial portion of said hollow tube where the liquid is dirt free and having its ends or outlet portions at the space between said thrust runner bearing surfaces, whereby rotation of said hollow tube causes a corresponding rotation of said cross-flow tube and thus centrifugally forces the liquid therein outward toward the outlet portions from which the liquid exits to form the hydrodynamic thrust bearing film.

16. A device as defined in claim 9 wherein the means for diverting clean liquid to the clearance region is a centrifugal separating pump in the form of a cross-flow tube having its inlet at the axial portion of said hollow tube where the liquid is dirt-free and having its ends or outlet portions adjacent the clearance region, whereby rotation of said hollow tube causes a corresponding rotation of said cross-flow tube and thus centrifugally forces the liquid therein outward toward the outlet portions from which the liquid exits to form the hydrodynamic rotor supporting film.

17. A device as defined in claim 9 wherein the means for permitting the unclean liquid to surround and cool the stator element while preventing such fluid from mingling with the clean fluid in the clearance region includes a plurality of spacers which space the stator element away from the interior of said motor casing to provide coolant passages, and a seal means mounted on the end of the hollow tube which prevents liquid exiting from said hollow tube from flowing back toward said clearance region.

18. A device as defined in claim 9 but further characterized by means for returning the liquid from said hollow tube to the first impeller, said means including a plurality of flow passages in said first impeller extending between said pump casing and said motor casing.

19. A motor-pump unit comprising:

fluid-tight casing means having an inlet and an outlet;

a stator member located in said casing and having a central cylindrical bore;

a cylindrical rotor member having an outside diameter less than that of said stator bore;

means provided in said casing means for mounting said rotor member when at rest so that said rotor is free to assume limited skew positions within said stator bore;

fluid directing means in communication with said inlet for producing upon rotation of said rotor a flowing fluid film between said rotor and said stator and at sufficient effective pressure to provide the support for said rotor member whereby said rotating rotor member is thereby coaxially aligned with said stator bore, said film providing substantially the sole support for said stator;

a tube mounted axially in said rotor;

conduit means coupled to said tube for directing fluid between said rotor and said stator bore;

means fluidly coupled to said tube for producing fluid flow therein at a hydrodynamic pressure greater than that of entry pressure;

impeller means coupled to said rotor means for rotation therewith to provide expulsion of high pressure fluid from said outlet and entry of low pressure fluid at said inlet; and power supply means for energizing said stator member to cause rotation of said rotor.

References Cited in the file of this patent

UNITED STATES PATENTS

| 3,004,180 | Macks | Oct. 10, 1961 |
| 3,027,471 | Burgwin et al. | Mar. 27, 1962 |

FOREIGN PATENTS

| 181,497 | Austria | Mar. 25, 1955 |